Figure 1:
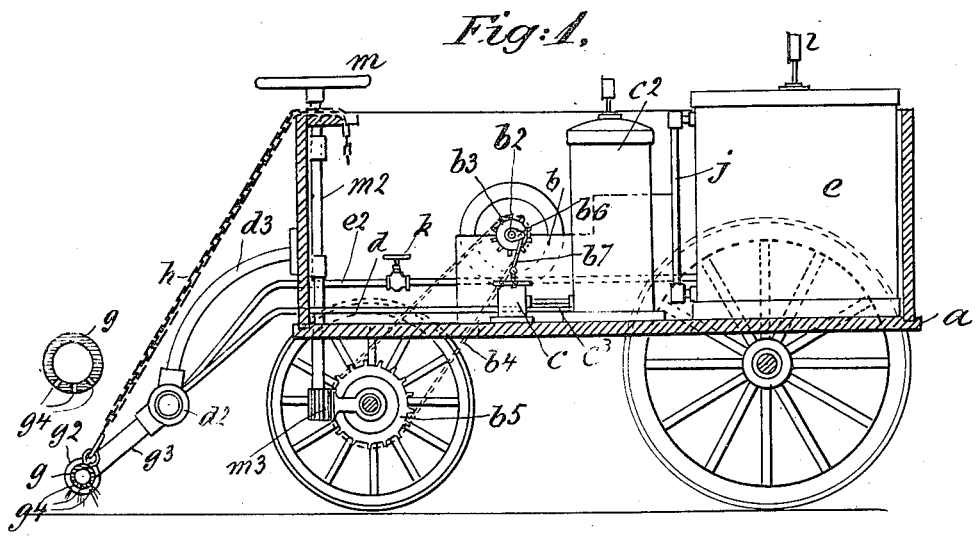

No. 859,356. PATENTED JULY 9, 1907.
A. I. WILSON.
SNOW MELTING APPARATUS.
APPLICATION FILED APR. 18, 1906.

WITNESSES
INVENTOR
Andrew I. Wilson,
BY
Edgar Tate & Co
ATTORNEYS

UNITED STATES PATENT OFFICE.

ANDREW I. WILSON, OF NEW YORK, N. Y.

SNOW-MELTING APPARATUS.

No. 859,356.

Specification of Letters Patent.

Patented July 9, 1907.

Application filed April 18, 1906. Serial No. 312,293.

*To all whom it may concern:*

Be it known that I, ANDREW I. WILSON, a citzen of the United States, and residing at New York, in the county of New York and State of New York, have invented certain new and useful Improvements in Snow-Melting Apparatus, of which the following is a specification, such as will enable those skilled in the art to which it appertains to make and use the same.

This invention relates to means or apparatus for melting snow on streets, and the object thereof is to provide an improved apparatus of this class by means of which the snow may be removed from the streets of cities and towns in a simple, effective and economical manner.

The invention is fully disclosed in the following specification, of which the accompanying drawing forms a part, in which the separate parts of my improvement are designated by suitable reference characters in each of the views, and in which;—

Figure 2:
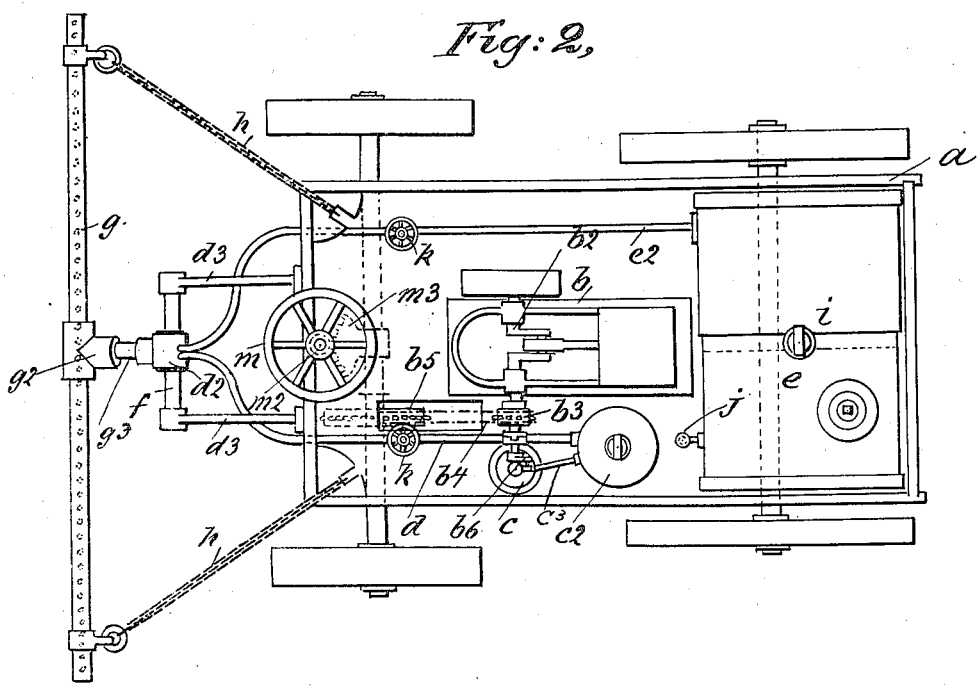

Figure 1 is a sectional side elevation of an apparatus involving my invention; and, Fig. 2 a plan view thereof.

In the practice of my invention I provide a truck, wagon or vehicle preferably provided with a bed or body $a$ in which is placed a gasolene motor $b$ provided with a power shaft $b^2$ having a sprocket wheel $b^3$ which is geared in connection with one of the axles of the truck or vehicle by means of a drive chain $b^4$ which is mounted on the wheel $b^3$ and a corresponding wheel $b^5$ secured to said axle. At one side of the motor $b$ is an air pump $c$ the piston of which is geared in connection with the shaft $b^2$ of the motor by means of a crank $b^6$ and a link member $b^7$ connected with said crank and the rod of the piston. The pump $c$ is placed in communication with an air storage tank $c^2$ by means of a pipe $c^3$, and connected with said storage tank is a pipe $d$ which extends forwardly and is connected with a coupling $d^2$ supported forwardly of the truck or vehicle body.

In the body or bed of the truck or vehicle is also placed a gasolene or other fuel tank $e$ with which is connected a pipe $e^2$ which also extends forwardly and is connected with the coupling $d^2$ in the same manner as the pipe $d$. Passing through the coupling $d^2$ is a pipe $f$ and this pipe supports the coupling $d^2$ and is in turn supported by arms $d^3$ secured thereto, and the arms $d^3$ support, as will be seen, both the pipe $f$ and the coupling $d^2$. A transversely arranged burner tube $g$ is connected with the coupling $d^2$ by means of another coupling $g^2$ and a connecting pipe $g^3$, and the burner tube $g$ is provided in the bottom portion thereof with perforations $g^4$ which are arranged longitudinally thereof. Connected with the opposite ends of the burner tube $g$ are chains or other flexible supports $h$ which are carried upwardly and backwardly into the bed or body of the truck, wagon or vehicle, and in practice the coupling $d^2$ is so made that the burner tube $g$ may be raised and lowered whenever desired, any suitable construction being adapted for this purpose. The gasolene tank $e$ is provided with a pressure gage $i$ and sight gage $j$, and the pipes $d$ and $e^2$ are provided with valves $k$.

The operation of the apparatus will be readily understood from the foregoing description when taken in connection with the accompanying drawing and the following statement thereof. The truck, wagon or vehicle may be steered by means of an ordinary hand wheel $m$ geared in connection with the front axle by means of a vertically arranged rod $m^2$ and any suitable gearing at $m^3$, and when the motor $b$ is in operation the vehicle may be propelled as will be readily understood and at the same time the pump $c$ is operated and air is forced into the tank $c^2$. When the valves $k$ are opened air and gasolene pass into the burner tube $g$ through the pipes $d$ and $e^2$, the tube $f$ and the coupling $d^2$, and the mixture of air and gasolene is ignited as it escapes from the tube $g$ and the flame thus produced is directed upon the snow which is rapidly melted thereby. The tube $g$ may be raised and lowered as desired and any suitable means may be provided for this purpose.

My invention is not limited to a gasolene motor for propelling the vehicle and compressing the air and forcing it into the tank $c^2$, and an electric or other motor may be provided for this purpose if desired.

This apparatus is simple in construction and operation, and the details of the construction of the various parts thereof may, as will be understood, be regulated or modified to any desired extent, and the burner tube $g$, as will be understood, may be made of any preferred length.

Having fully described my invention, what I claim as new and desire to secure by Letters Patent, is;—

1. In a snow melting device, the combination with a vehicle having four supporting wheels, of a motor carried by said vehicle and operatively connected to drive two of said wheels, an air pump connected with said motor, a burner connected to and carried by said vehicle, a hydrocarbon supply tank on said vehicle and means connecting said air pump and hydrocarbon tank with the burner, whereby provision is made for supplying a greater amount of fuel to the burner when the rate of movement of the vehicle is increased, substantially as described.

2. In a snow melting device, the combination with a vehicle, of a motor carried thereby and operatively connected with the running gear of said vehicle to drive the same, an air pump mounted on said vehicle and connected with said motor, a burner and a gasolene tank, a pipe construction connecting the gasolene tank and the said air pump with the burner, the pipe from the said tank and that from said air supply uniting before reaching the burner, whereby the rate of feeding the fuel to the burner is proportioned to the speed of the vehicle, substantially as described.

In testimony that I claim the foregoing as my invention I have signed my name in presence of the subscribing witnesses this 17th day of April 1906.

ANDREW I. WILSON.

Witnesses:
F. A. STEWART,
C. E. MULREANY.